Sept. 8, 1959  W. WADDINGTON  2,903,609
DYNAMO ELECTRIC MACHINES
Filed June 5, 1957  3 Sheets-Sheet 1

INVENTOR
WILLIAM WADDINGTON
ATTORNEY

Sept. 8, 1959 W. WADDINGTON 2,903,609
DYNAMO ELECTRIC MACHINES
Filed June 5, 1957 3 Sheets-Sheet 2
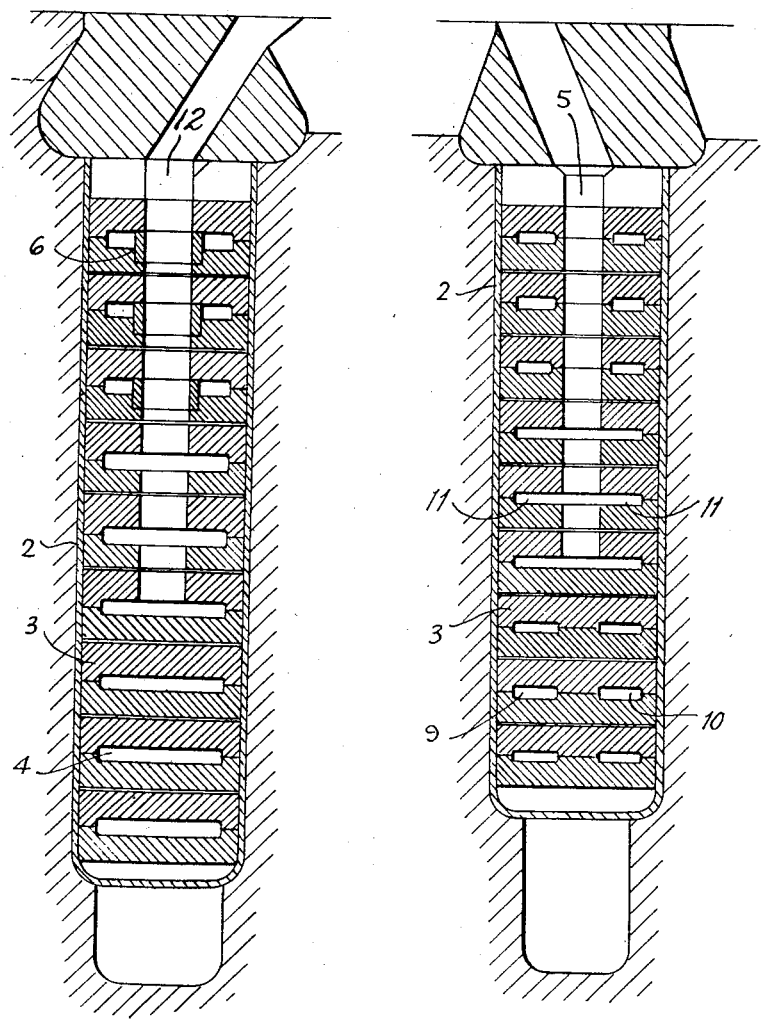
INVENTOR
WILLIAM WADDINGTON
ATTORNEY Sept. 8, 1959 W. WADDINGTON 2,903,609
DYNAMO ELECTRIC MACHINES
Filed June 5, 1957 3 Sheets-Sheet 3
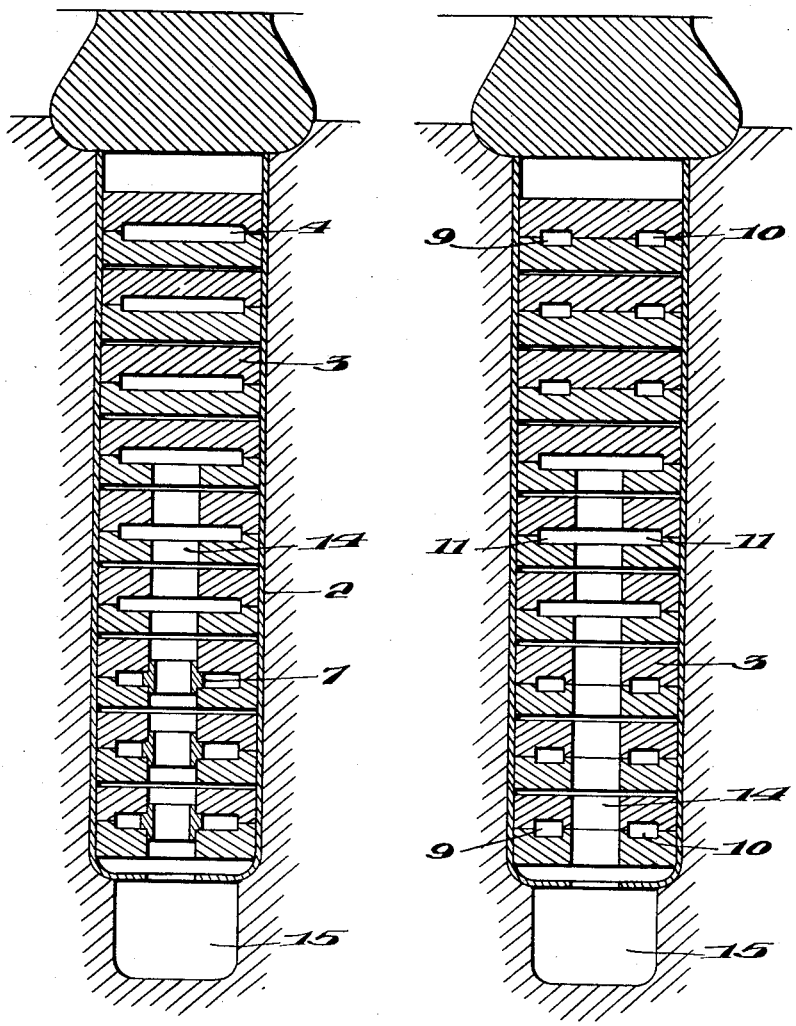
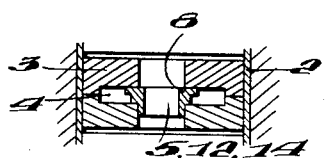
INVENTOR
WILLIAM WADDINGTON,
BY
ATTORNEY

United States Patent Office 2,903,609
Patented Sept. 8, 1959

2,903,609

DYNAMO ELECTRIC MACHINES

William Waddington, West Haddon, England, assignor to The British Thomson-Houston Company Limited, London, England, a British company Application June 5, 1957, Serial No. 663,684

Claims priority, application Great Britain June 15, 1956

8 Claims. (Cl. 310—64)

This invention relates to dynamo-electric machines and particularly to turbo-alternators in which a cooling fluid, such as hydrogen is employed.

In turbo-alternators it is becoming common practice to use hydrogen cooling with the hydrogen in direct contact with the rotor copper, and to effect this the conductors are provided with passages, through which the hydrogen can flow. Hydrogen is introduced into these passages from radial slots, the radial slots being provided at intervals in the conductors and fed from sub-slots machined below the main winding slots. As the cross sectional area of the sub-slots is limited by mechanical and magnetic considerations the amount of gas which can be fed through the sub-slots is not adequate to ensure satisfactory ventilation of the middle section of a long rotor. It is therefore proposed to introduce hydrogen from the periphery of the rotor over the middle section of the core. It will be appreciated that if each radial duct feeds all the conductors in the slot there would be considerable variation in the amount of hydrogen each conductor received so that uniform cooling is not achieved by this arrangement.

The object of the present invention is to effect substantially uniform cooling of the rotor winding.

According to the present invention a rotor for a dynamo-electric machine has stacked conductor windings embedded in slots, the conductors containing cooling passages extending longitudinally of the slots, together with radially extending inlet and outlet passages for feeding cooling fluid to and from the cooling passages and wherein each radial passage is selectively connected to a limited number of associated conductor cooling passages so as to obtain adequate flow of cooling fluid in each cooling passage.

The cooling fluid may be supplied to the radial inlet passages from the periphery of the rotor or from sub-slots extending beneath the main winding slots, the sub-slots in turn being fed from the ends of the rotor. In one arrangement the sub-slots feed cooling fluid to the inlet passages situated at the end sections of the rotor while over the midsection the inlet passages are fed from the periphery of the rotor. Alternatively the sub-slots can be dispensed with, and all the radial inlet slots along the rotor core fed from the periphery of the rotor.

In one embodiment of the invention the radial passages intersect the longitudinal passages and means are provided to seal off the longitudinal passages apart from the selected passages.

In an alternative embodiment the conductors each contain two parallel longitudinal passages with the radial passages extending between them, the radial passages connect with selected longitudinal passages by ports extending circumferentially of the rotor between said radial and longitudinal passages.

In order that the invention may be more fully understood reference will now be made to the accompanying drawings in which:

Fig. 2 is a view along the line A—A of Fig. 1, while Fig. 3 shows an alternative embodiment of the invention.

Fig. 4 is a view corresponding to Fig. 2 but displaced axially along the rotor;

Fig. 5 shows an alternative embodiment to the view of Fig. 4; and

Fig. 6 shows a detailed alternative to Fig. 2 and Fig. 4.

Figure 1:
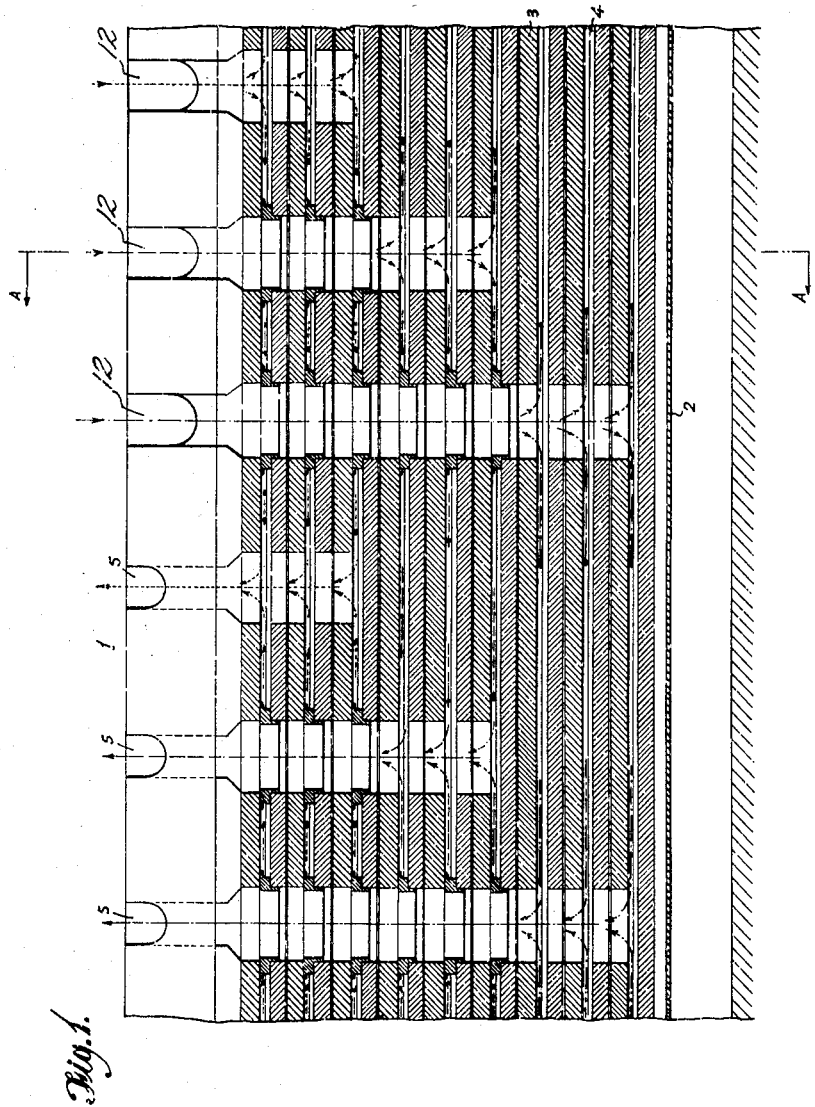
Fig. 1 shows a section of a rotor in a plane containing its axis and showing one embodiment of the invention.

Referring to Figs. 1 and 2, which show one embodiment of the invention, there is shown a rotor 1 having slots 2 containing stacked conductor windings 3 embedded therein. The conductors each contain cooling passages 4 extending longitudinally of the slots and have radially extending inlet passages 12 for feeding cooling fluid from the periphery of the rotor to the cooling passages 4 and radially extending outlet passages 5 passing from cooling passages 4 to the periphery of the rotor. Each radial passage 5 and 12 is selectively connected to a limited number of longitudinal passages 4 only, so as to obtain an adequate flow of cooling fluid in each longitudinal passage throughout the depth of each slot.

The passages 5 and 12 extend radially inwardly into the conductors in the slots and intersect the longitudinal passages 4. Intervening longitudinal passages which it is desired to isolate from a particular radial passage, have blocks fitted. These blocks may take a number of alternative forms the preferred arrangement being as at 6. The radial passages 5 and 12 need extend into the slot only as far as is necessary to connect with the appropriate selected longitudinal passages.

By this means the conductor cooling passages can be divided into groups, with each group being provided with its own inlet and outlet passages so that an adequate flow of cooling fluid is obtained in each group. The arrangement of Fig. 1 shows a slot having three such groups of cooling passages.

Fig. 3 shows an alternative embodiment of the invention and in this figure in which like parts have like reference numerals the conductors each contain two parallel longitudinal passages 9 and 10 with the radial passages 5 extending between them and not directly connected with either of them. Where connections are required in appropriate parts of the slots connecting passages 11 are machined circumferentially between the radial and longitudinal passages. In this embodiment also it is only necessary for the radial passages to extend to an appropriate depth.

Fig. 4 shows a section of conductor slot 2 of Fig. 2 but displaced axially therefrom along the length of the rotor. In Fig. 4 like parts have like reference numerals to Fig. 2. In this figure, inlet passages 14 extend radially through the conductors 3 in the slots 2 and communicate with the sub slots 15 extending beneath the main winding slots 2. Inlet passage 14 passes part way into the slots and intersects longitudinal passages 4 of the conductors through which it passes, and blocks 7 are provided to isolate selected longitudinal passages 4 from the radial passages 14.

Fig. 5 shows an alternative embodiment of the invention corersponding to Fig. 3. In this figure, the conductors each contain two parallel longitudinal passages 9 and 10, as in Fig. 3, with the radial inlet passage 14 extending between them and communicating with sub slot 15. Where connections are required in appropriate parts of the slots, connecting passages 11 are machined circumferentially between the radial passage 14 and the longitudinal passages 9 and 10.

Fig. 6 shows a single pair of conductors 3 containing a longitudinal passage 4, as in Figs. 2 and 4, but with an alternative shape of block contained therein to isolate passage 4 from the radial passage 5, 12, or 14, as the case

What I claim is:

1. A rotor for a dynamo-electric machine having stacked conductor windings embedded in slots, the conductors each containing cooling passages extending longitudinally of the slots, inlet passages extending from the periphery of said rotor, outlet passages extending from said longitudinally extending cooling passages to the periphery of said rotor, said inlet and outlet passages passing through the conductors in the slots in a radial direction so as to intersect said longitudinal passages, and means for sealing off from said radially extending passages selected intersecting longitudinally extending passages in the conductors through which said radial passages pass.

2. A rotor for a dynamo-electric machine having stacked conductor windings embedded in slots, the conductors each containing two parallel cooling passages extending longitudinally of the slots, inlet and outlet passages extending radially through the conductors in the slots and passing between said parallel longitudinal passages, and circumferentially extending connecting passages between each radial passage and selected longitudinal passage.

3. A rotor for a dynamo-electric machine having stacked conductor windings embedded in slots, the conductors each containing two parallel cooling passages extending longitudinally of the slots, inlet passages extending radially through the conductors in the slots and passing between said cooling passages, means coupling said inlet passages to the periphery of the rotor in such a manner as to force cooling fluid into said inlet passages on rotation of the rotor, outlet passages extending radially through the conductors in the slots and passing between said cooling passages, means coupling said outlet passages with the periphery of the rotor in such manner as to allow cooling fluid to escape from said outlet passages, and means for connecting each radial passage with some only of the longitudinal cooling passages.

4. A rotor for a dynamo-electric machine having stacked conductor windings embedded in slots, the conductors each containing two parallel cooling passages extending longitudinally of the slots, sub-slots extending beneath the main winding slots, inlet passages extending radially through the conductors in the slots between said cooling passages and communicating with said sub-slots, outlet passages extending radially through the conductors in the slots between said cooling passages and communicating with the periphery of the rotor, and means for connecting each radial passage with some only of the longitudinal passages.

5. A rotor for a dynamo-electric machine having stacked conductor windings embedded in slots, the conductors each containing two parallel cooling passages extending longitudinally of the slots, sub-slots extending cating with said sub-slots and extending radially through beneath the main winding slots, inlet passages communithe conductors in the slots between said cooling passages, further inlet passages extending radially through the conductors in the slots between said cooling passages, means coupling said further inlet passages to the periphery of the rotor in such a manner as to force cooling fluid into said further inlet passages on rotation of the rotor, outlet passages extending radially through the conductors in the slots between said cooling passages, means coupling said outlet passages with the periphery of the rotor in such a manner as to allow cooling fluid to escape from said outlet passages, and means for connecting each radial passage with some only of the longitudinal passages.

6. A rotor for a dynamo-electric machine having a core with winding slots therein, windings of stacked conductors embedded in said slots, said conductors each containing cooling passages extending longitudinally of the slots, inlet passages extending radially through said conductors in the slots and intersecting said longitudinal passages, means coupling said inlet passages to the periphery of the rotor in such a manner as to force cooling fluid into said inlet passages on rotation of the rotor, outlet passages extending radially through said conductors in said slots and spaced axially from said inlet passages and intersecting said longitudinal passages, means coupling said outlet passages with the periphery of the rotor in such a manner as to allow cooling fluid to escape from said outlet passages on rotation of the rotor, and means for sealing off selected intersecting longitudinal cooling passages from said radial inlet and outlet passages in the conductors through which said inlet and outlet passages pass.

7. A rotor for a dynamo-electric machine having a core with winding slots therein, windings of stacked conductors in said slots, said conductors each containing cooling passages extending longitudinally of said slots, sub slots extending beneath said winding slots, inlet passages extending radially through said conductors in said winding slots so as to intersect said longitudinal passages, said inlet passages communicating with said sub slots, outlet passages extending radially through said conductors in said winding slots so as to intersect said longitudinal passages, said outlet passages being spaced axially from said inlet passages and communicating with the periphery of the rotor, and means for sealing off selected intersecting longitudinal passages from said radial inlet and outlet passages in said conductors through which said radial inlet and outlet passages pass.

8. A rotor for a dynamo-electric machine having a core with winding slots therein, windings of stacked conductors in said slots, said conductors each containing cooling passages extending longitudinally of said slots, sub slots extending beneath said winding slots, radial inlet passages extending through said conductors in said winding slots and communicating with said sub slots, said radial inlet passages intersecting said cooling passages, further radial inlet passages extending through said conductors in said winding slots, said further radial inlet passages intersecting said cooling passages, means coupling said further inlet passages to the periphery of the rotor in such a manner to force cooling fluid into said further radial inlet passages on rotation of the rotor, radial outlet passages extending through said conductors in said winding slots and intersecting said longitudinal cooling passages, means coupling said radial outlet passages with the periphery of the rotor in such a manner as to allow cooling fluid to escape from said outlet passages on rotation of the rotor, and means for sealing off selected intersecting cooling passages from said radial passages in the conductors through which said radial passages pass.

References Cited in the file of this patent

UNITED STATES PATENTS

| 2,043,120 | Punga | June 2, 1936 |
| 2,653,255 | Baudry | Sept. 22, 1953 |
| 2,702,870 | Norris | Feb. 22, 1955 |
| 2,791,707 | Willyoung | May 7, 1957 |

FOREIGN PATENTS

| 903,002 | Germany | Feb. 1, 1954 |
| 1,091,810 | France | Nov. 3 1954 |